(12) United States Patent
Hargis

(10) Patent No.: US 9,797,429 B2
(45) Date of Patent: Oct. 24, 2017

(54) DRILL POINT FASTENER

(71) Applicant: HARGIS INDUSTRIES, LP, Tyler, TX (US)

(72) Inventor: Joe A. Hargis, Tyler, TX (US)

(73) Assignee: HARGIS INDUSTRIES, LP, Tyler, TX (US)

( * ) Notice: Subject to any disclaimer, the term of this patent is extended or adjusted under 35 U.S.C. 154(b) by 4 days.

(21) Appl. No.: 14/958,243

(22) Filed: Dec. 3, 2015

(65) Prior Publication Data

US 2016/0305463 A1 Oct. 20, 2016

Related U.S. Application Data

(60) Provisional application No. 62/147,443, filed on Apr. 14, 2015.

(30) Foreign Application Priority Data

Jun. 5, 2015 (TW) .............................. 104208950 U

(51) Int. Cl.
*F16B 35/04* (2006.01)
*F16B 25/10* (2006.01)
*F16B 25/00* (2006.01)
*F16B 43/00* (2006.01)

(52) U.S. Cl.
CPC ........ *F16B 25/103* (2013.01); *F16B 25/0031* (2013.01); *F16B 43/001* (2013.01)

(58) Field of Classification Search
CPC .............. F16B 25/0031; F16B 25/0057; F16B 25/0068; F16B 25/0073; F16B 25/0084; F16B 25/10; F16B 25/103; F16B 35/04; F16B 43/001

USPC ....... 411/386, 387.1, 387.6, 387.8, 394, 412, 411/413, 415

See application file for complete search history.

(56) References Cited

U.S. PATENT DOCUMENTS

| | | | |
|---|---|---|---|
| 3,153,971 A | 10/1964 | Lovisek | |
| 3,177,755 A * | 4/1965 | Kahn | E04C 2/043 411/386 |
| 3,207,023 A * | 9/1965 | Knohl | F16B 25/0031 411/387.3 |
| 3,399,589 A | 9/1968 | Breed | |
| 3,452,636 A | 7/1969 | Cohen et al. | |
| 3,882,752 A | 5/1975 | Gutshall | |
| 4,125,050 A * | 11/1978 | Schwartzman | F16B 25/0084 408/228 |
| 4,241,638 A * | 12/1980 | Shimizu | F16B 25/0031 411/386 |

(Continued)

*Primary Examiner* — Roberta Delisle
(74) *Attorney, Agent, or Firm* — Nixon & Vanderhye PC

(57) ABSTRACT

A fastener may include an elongated shank, a head at a distal end of the shank, and a drill point at a terminal end of the shank, which is opposite to the distal end. The fastener may include a primary thread starting at the drill point and extending along the shank towards the head. The fastener may include a secondary thread starting at the drill point, extending along the shank towards the head, and stopping in an axial direction before the primary thread ends. The secondary thread may be radially located 180 degrees from the primary thread. The drill point may include a plurality of radially extending cutting edges and one or more relieved flute portion extending along the surface of the drill point.

25 Claims, 4 Drawing Sheets

(56) References Cited

U.S. PATENT DOCUMENTS

| | | | | |
|---|---|---|---|---|
| 4,292,876 A | * | 10/1981 | De Graan | F16B 43/001 411/369 |
| 4,645,396 A | * | 2/1987 | McCauley | F16B 25/0031 408/224 |
| 4,655,661 A | * | 4/1987 | Brandt | F16B 25/0031 408/224 |
| 4,701,088 A | | 10/1987 | Crull | |
| 4,749,321 A | * | 6/1988 | Knohl | F16B 37/14 411/369 |
| 4,749,322 A | * | 6/1988 | Sygnator | F16B 5/02 411/387.3 |
| 4,948,319 A | * | 8/1990 | Day | F16B 1/0071 411/377 |
| 5,433,570 A | | 7/1995 | Koppel | |
| 5,622,464 A | | 4/1997 | Dill et al. | |
| 5,779,417 A | | 7/1998 | Barth et al. | |
| 6,045,312 A | | 4/2000 | Hsing | |
| 6,231,286 B1 | | 5/2001 | Bogatz et al. | |
| 6,764,262 B1 | | 7/2004 | Hargis | |
| 6,854,942 B1 | | 2/2005 | Hargis | |
| 7,682,118 B2 | * | 3/2010 | Gong | F16B 25/0047 411/387.1 |
| 7,682,119 B2 | * | 3/2010 | Chen | F16B 25/0015 411/411 |
| 2004/0156696 A1 | * | 8/2004 | Grosch | B29C 65/561 411/378 |
| 2008/0080951 A1 | * | 4/2008 | Lin | F16B 25/0031 411/387.6 |
| 2009/0010734 A1 | * | 1/2009 | Lin | F16B 23/0015 411/413 |
| 2009/0175702 A1 | * | 7/2009 | Lin | B25B 13/065 411/386 |
| 2012/0183371 A1 | * | 7/2012 | Druschel | F16B 25/0015 411/387.1 |
| 2012/0207564 A1 | * | 8/2012 | Kochheiser | F16B 25/0031 411/412 |

* cited by examiner

DRILL POINT FASTENER

CROSS-REFERENCES TO RELATED APPLICATIONS

The present application claims priority to U.S. Provisional Application No. 62/147,443, filed on Apr. 14, 2015, and to Taiwan Utility Model Patent Application 104208950 filed on Jun. 5, 2015, the entirety of which are incorporated by reference in this application.

TECHNICAL FIELD

Certain example embodiments described herein relate generally to fasteners. More particularly, certain example embodiments described herein relate to fasteners, such as screws, for securing a plurality of objects together and to methods of their manufacture.

BACKGROUND AND SUMMARY

Fasteners have been designed in many shapes, sizes, and configurations for joining two or more objects together. Screws and bolts are some of the more commonly used fasteners for joining objects. Most screws and bolts fall under the category of externally threaded fasteners which include external threads (e.g., male threads) wrapped around a cylinder extending from a head of the fastener. Externally threaded fasteners may be designed for assembly with a nut or an object having a nut thread matching the thread of the fastener. Other externally threaded fasteners may have ends designed for insertion into a hole (e.g., a pre-drilled pilot hole, punched hole, or nested hole) or may have an end with a pierce-point that is designed to penetrate a surface of the object to be joined. A pierce point, also known as a needle point, speed point or sprint point, provides a sharp end point that is configured to pierce the surface to be joined.

A fastener with a pierce point may be used, for example, to join sheet metal to other objects. As the pierce point of the fastener pierces through the sheet metal, the thread of the fastener engages and drives the fastener through the layer(s) of the sheet metal and, if provided, into other object(s) with ease and great speed.

In applications where the fastener is exposed to elements (e.g., weather elements) that may corrode the fastener, the fastener is coated with a protective material layer (e.g., paint, zinc, or copper). Unfortunately, however, during the process of coating the fastener, the sharpness of the end point may be compromised due to deposits of the coating material on the end point. In addition, during the process of coating the fastener, due to processes involved in the coating, a heavier layer of material may be deposited on the polar ends of the fastener. While such heavier deposition of the material on the head end of fastener may not have an adverse effect, a thick coating on a pierce point rounds off what should be a sharp point. This rounding causes the pierce-point to be less effective in quickly piercing the surface to be fastened and in some cases may not even allow the surface to be pierced. Such rounding of the pierce-point is particularly observed during an electroplating process that causes a heavier layer of material (e.g., zinc) to be formed on the ends of the fastener than the center portion of the fastener including the threads.

Certain example embodiments address these and/or other concerns. For instance, certain example embodiments relate to a fastener with a point end geometry that is less affected by unequal distribution of a coating material. Certain example embodiments provide a fastener with a self-drilling point that allows for quick fastener installation. The geometry of the self-drilling point reduces the undesired buildup of coating material on the end of the fastener.

In certain example embodiments, a fastener may include an elongated shank, a head at a distal end of the shank, and a drill point at a terminal end of the shank, which is opposite to the distal end. The fastener may include a primary thread starting at the drill point and extending along the shank towards the head. The fastener may include a secondary thread starting at the drill point, extending along the shank towards the head, and stopping in an axial direction before the primary thread ends. The secondary thread may be radially located 180 degrees from the primary thread. The drill point may include a plurality of radially extending cutting edges and one or more relieved flute portions extending along the surface of the drill point.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 2:
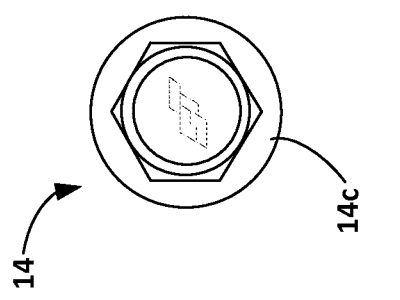
FIGS. 1-4 illustrate exemplary embodiments of a fastener according to various embodiments of the present disclosure.

Fasteners have been used in the construction industry for years to secure roof and/or wall sheeting material to structural framing. For example, in post-frame construction, exterior walls made of roll-formed corrugated metal panels may be secured to a wood structural frame (vertical wooden posts and horizontal wooden trusses) using hardened steel fasteners. These fasteners may include a hex head, a rubber and/or a steel washer, sharp and deep crested threads along the shank (e.g., which may be one to three inches in length), and a very sharp-point. The fastener may be installed with an electric screw-gun fitted with a hexagonal socket that fits the head of the fastener. During installation of the fastener, the sharp-point of the fasteners is placed at the point of attachment on the corrugated metal panel. As pressure is applied to the fastener, the screw gun is activated and the sharp-point penetrates the panel. Once the panel is penetrated, the deep crested threads engage with the wood substructure until the full length of the shank has tapped completely and the rubber washer is compressed against the panel to create a seal. The sharpness of the pierce point (e.g., a gimlet point) and the thread definition at the point's apex is critical to the fastener's ability to penetrate the metal panel. Should the point be blunted or of a spherical shape after manufacturing, the performance will be less than acceptable or, in some cases, will not penetrate the panel at all.

The fasteners may be made of hardened carbon steel. They may also be painted to match the color of the corrugated metal panel. The fasteners may need to have measurable and consistent dimensional aspects, as well physical values that include tensile strength, ductility, and hardness. The fasteners may be designed so as to provide for quick installation into the metal panel and/or wood/metal frame.

The fasteners, which are installed on the exterior of the post-frame structure, should also be resistant to the corrosive effects of acid rain, temperature extremes, UV rays, etc. Thus, the hardened steel fasteners (e.g., carbon steel fasteners) may be coated prior to use in order to protect them from environmental conditions that will cause rusting of their surface. Manufacturers typically protect the fasteners from corrosion by galvanizing the surface. The galvanizing can be applied in one of three methods: hot dipping (which is typically not used for post-frame fasteners); mechanical plating; or electroplating. Mechanical plating is a process in which a coating is applied to the fasteners by tumbling them with in a mixture of water, a metallic powder (e.g., zinc powder) and chemicals until a predetermined thickness of metallic coating has accumulated on the fastener's surface.

The electroplating process, as the name implies, subjects a quantity of fastener to an electric current in the presence of, for example, zinc ions dispersed in an electrolyte. During this process, a predetermined current density applied to the system creates an electromagnetic field around the fastener. The zinc ions are electrically attracted to the fastener and are deposited in a tight, adherent film over the surface of the fastener.

Variations in current density, length of the fastener, surface area of the fastener, time of exposure, and other factors may determine the thickness of the metal coating. These variables may be considered in predetermining the time required to deposit a given thickness of metal coating onto the surface of the fastener. However, the metal coating may not be deposited uniformly over the entire surface of the fastener. The polar effect of the electromagnetic field tends to deposit more metal coating at the polar ends, that is, the head portion and the point portion of the fastener. Consequently, less metal coating is deposited at the axial midpoint of the fastener. The operator of the electroplating system tends to use the axial midpoint as his reference point to assure that the minimum specified metal coating thickness is deposited at the midpoint of the fastener.

Thickness measurements taken at three selected locations, that is, the head, the axial mid-length, and the point apex, confirm the non-uniform distribution of metal coating along the axial length. The metal coating (e.g., zinc) thickness on the head portion of the fastener varies from 1.5 to as high as 3.5 times the metal coating thickness measured at the mid-length. Similarly, thickness of metal coating (e.g., zinc) at the point apex has shown to vary from 5 to as high as 8 times the thickness of metal coating measured at mid-length of the fastener.

In most cases, this extra metal coating thickness on the head of the fastener does not adversely affect the installation performance. This extra thickness tends to enhance the corrosion resistance since the head of the fastener is the only portion of the fastener exposed to weathering conditions. However, the disproportionately greater thickness of the metal coating at the point apex adversely affects the fastener's ability to pierce a surface of a first object (e.g., a metal panel) and/or subsequent objects during installation.

The polar attraction may be essentially equal at both poles of the fastener during the electroplating process. However, because the surface area of the polar point is very small compared to the polar head of the fastener, the metal coating tends to form a spherical ball comparable to a ball-point pen instead of a uniform layer. During the attempted installation, this spherical point allows the fastener to rotate freely on the surface of first object (e.g., surface of a steel panel) instead of quickly piercing the steel panel.

Observations and measurements confirm that reducing the difference in surface area of the polar ends tends to mitigate the adverse effects of disproportionate distribution of the metal coating (e.g., zinc). Because the surface area of the polar ends affects the distribution of metal coating on the respective ends, increasing the surface area of the point end should allow more uniform distribution of the metal coating without the spherical build-up of metal coating and thereby improve the fastener's ability to penetrate the steel panel.

As discussed in more detail below, in some of the embodiments of the present disclosure, a point geometry was selected that provides two cutting edges radially displaced at 180 degrees terminating at an intersection that does not include a sharp point apex provided by existing fasteners. The two cutting edges may be offset slightly to allow removal of steel sheeting as soon as rotation of the fastener begins. The result is that the fastener can penetrate the steel sheet almost immediately without freely spinning as was the case with a sharp point of existing fasteners. Test results have shown that, in the embodiment discussed below, there is no excessive non-functional metal coating buildup that would prevent the fastener from penetrating the sheeting as intended. The thickness of metal coating (e.g., zinc) at the cutting edges at the end of the drill point fastener was significantly reduced when compared to a sharp pointed fastener.

FIGS. 1-4 illustrate an exemplary embodiment of a fastener 10 according to an embodiment of the present disclosure. The fastener 10 may include an elongated shank 12, a head 14 at a distal end of the shank 12, and a drill point 16 at a terminal end of the shank 12, which is opposite to the distal end. The fastener 10 may include a plurality of threads 18, 20 provided along the shank 12. A first thread 18 may be formed extending along the shank 12 on a first portion and a second portion of the shank 12. A second thread 20 may be formed extending along the shank 12 on the second portion of the shank 12.

Figure 3A:
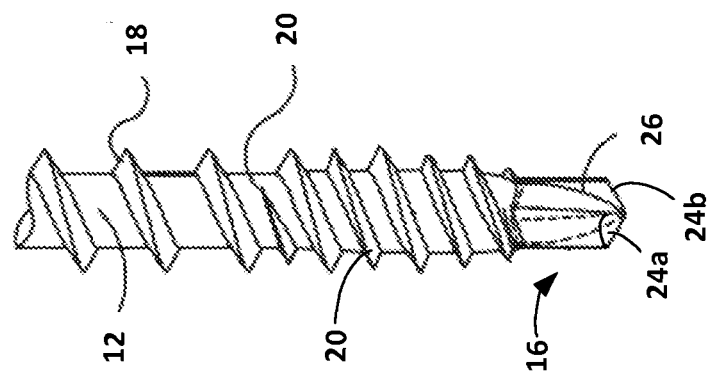
Figure 3B:
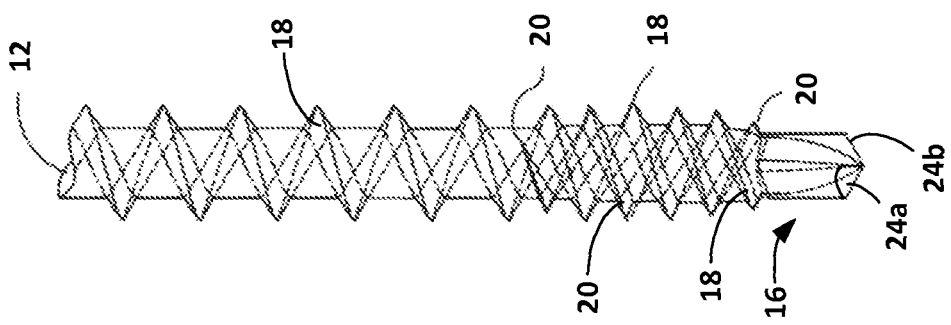

The first thread 18 may begin axially at a first location L1 below the head 14 at the distal end and continue to a predetermined second location L2 axially remote from the distal end and the first location L1. The first thread 18 may continue past the second location L2 and to a predetermined third location L3 axially remote from the distal end and the second location L2. The predetermined third location L3 may be in the vicinity of the terminal end of the shank 12. The second thread 20 may begin axially at the second location L2 and continue to the predetermined third location L3. As shown in FIGS. 3A and 3B, the first thread 18 and the second thread 20 may be helically wound along the axis and around the periphery of the shank 12.

A thread major diameter 18a and/or a thread pitch of the first thread 18 may remain constant between the first location L1 and the second location L2. Past the second location L2, the thread major diameter 18a and/or the thread pitch of the first thread 18 may be changed. For example, past the second location L2, the thread major diameter 18a of the first thread 18 may be reduced from a first value to a predetermined second value, which is different from the first value. Similarly, past the second location L2, the pitch of the first thread 18 may be reduced from a first thread pitch value to a predetermined second thread pitch value, which is different from the first thread pitch value. The thread pitch of the first and second threads 18, 20 between the second location L2 and the third location L3 may be equal.

The thread major diameter 18a of the first thread 18 may be gradually reduced from the first value to the predetermined second value in the vicinity of the second location L2.

Between second location L2 and the third location L3 the major diameter 18a and/or the thread pitch of the first thread 18 may remain constant. At the third location L3, the first thread 18 may taper at a predetermined angle relative to the axis of the fastener 10 and terminate in the vicinity of the third location L3. The first thread 18 may taper and terminate at a predetermined location axially remote from the point apex with a smooth run-out unto an extended cylindrical portion of the drill point 16.

A thread major diameter 20a and/or a thread pitch of the second thread 20 may remain constant between the second location L2 and the third location L3. The thread major diameter 20a of the second thread 20 may be equal to the reduced thread major diameter 18a (i.e., the predetermined second value). Thus, the thread major diameter 20a of the second thread 20 and the thread major diameter 18a of the first thread 18 may both be equal between the second location L2 and the third location L3. The second thread 20 may be radially located 180 degrees from the first thread 18 (e.g., terminate on opposite sides of the surface of the shank 12). The second thread 20 may extend axially at a mid-pitch of the first thread 18. At the third location L3, the second thread 20 may taper at a predetermined angle relative to the axis of the fastener 10 and terminate in the vicinity of the third location L3. The second thread 20 may taper and terminate at a predetermined location axially remote from the point apex with a smooth run-out unto an extended cylindrical portion of the drill point 16. The second thread 20 may taper at a predetermined angle that is the same as the angle at which the first thread 18 tapers at the third location L3.

The minor diameter 22 of the first and second threads 18 and 20 may be the same between the first location L1 and the second location L2 and between the second location L2 and the third location L3. In one embodiment, the minor diameter of the first and second threads 18 and 20 between the second location L2 and the third location L3 may be smaller than the minor diameter of the first threads 18 between the first location L1 and the second location L2.

The drill point 16 may have a predetermine diameter 16a and axial length 16b. In one embodiment, the diameter of the drill point 16a may be smaller than the minor diameter 22 of the first and/or second threads 18, 20. A conical taper may be provided between the minor diameter 22 and the predetermine diameter 16a of the drill point 16. In another embodiment, the diameter 16a of the drill point 16a may be the same as the minor diameter 22 of the first and/or second threads 18, 20. In one embodiment, the predetermine diameter 16a of the drill point 16 may be equal to the axial length 16b of the drill point 16. In another embodiment, the axial length 16b of the drill point 16 may be greater than the predetermine diameter 16a of the drill point.

The drill point 16 may include two radially extending cutting edges 24a, 24b spaced apart approximately 180 degrees and sloping axially from the terminal end to an intersecting location on an outer surface of the shank 12. As used herein, approximately may refer to being almost, but not exactly, 180 degrees. In one embodiment, the drill point 16 may include more than two radially extending cutting edges (e.g., three or four).

Figure 1:
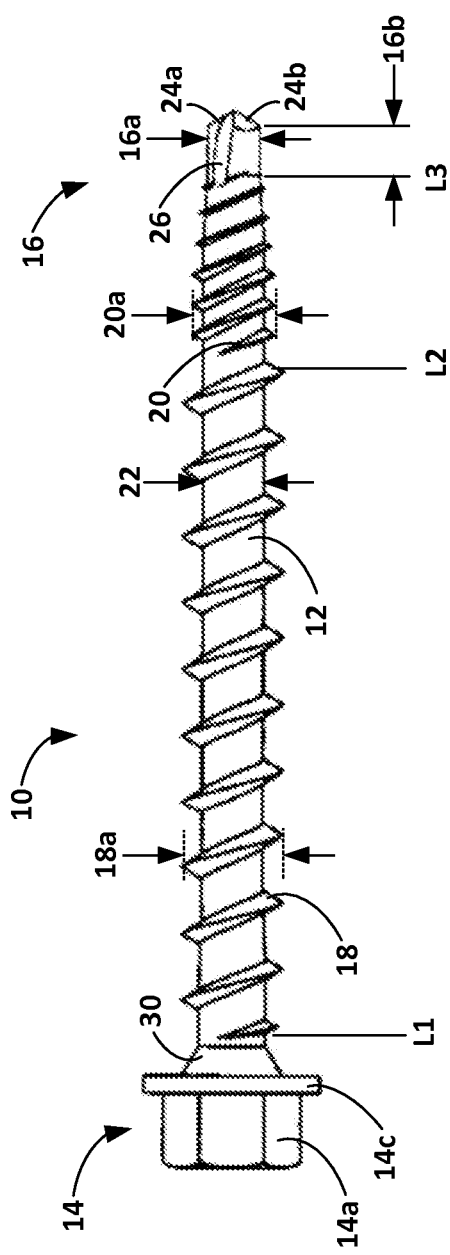

A first relieved flute portion 26 may extend axially from one of the cutting edges 24a, 24b and intersect or abut the thread run-out from at least one of the first and second thread 18, 20. In one embodiment, the first relieved flute portion 26 may extend axially from one of the cutting edges 24a, 24b and intersect or abut the thread run-out from the first thread 18 and a second relived flute portion (not shown) may extend axially from the other one of the cutting edges 24a, 24b and intersect or abut the thread run-out from the other second thread 20. As shown in FIG. 1, the first and second thread may be run over a back edge of the flute 26 to allow the threads to quickly engage the object after the drill point 16 penetrates the object. In one embodiment, a length of the flute portion 26 may be equal to the axial length 16b of the drill point 16. In another embodiment, a length of the flute portion 26 may be greater than the axial length 16b of the drill point 16.

The cutting edges 24a, 24b of the drill point 16 may be non-concurrent and/or non-interesting, such that, for example, the cutting edges 24a, 24b do not form a point apex (e.g., a single sharp point) at the terminal end of the fastener. The cutting edges 24a, 24b may be off-set from each other in a radial direction of the shank 12 so as to create a cutting action as soon as rotation of the fastener is started. During installation, the drill point 16 may be provided into a preformed aperture in an object (e.g., sheet metal) or create such an aperture as it is rotationally forced against the object.

In one embodiment, the thread major diameter 18a of the first thread 18 and the thread major diameter 20a of the second thread 20 at the second position may have a first value (e.g., value of the thread major diameter 18a between the first and second locations) and gradually be reduced in the axial direction away from the distal end until the thread major diameters 18a and 20a taper and terminate at the drill point 16.

Figure 4:
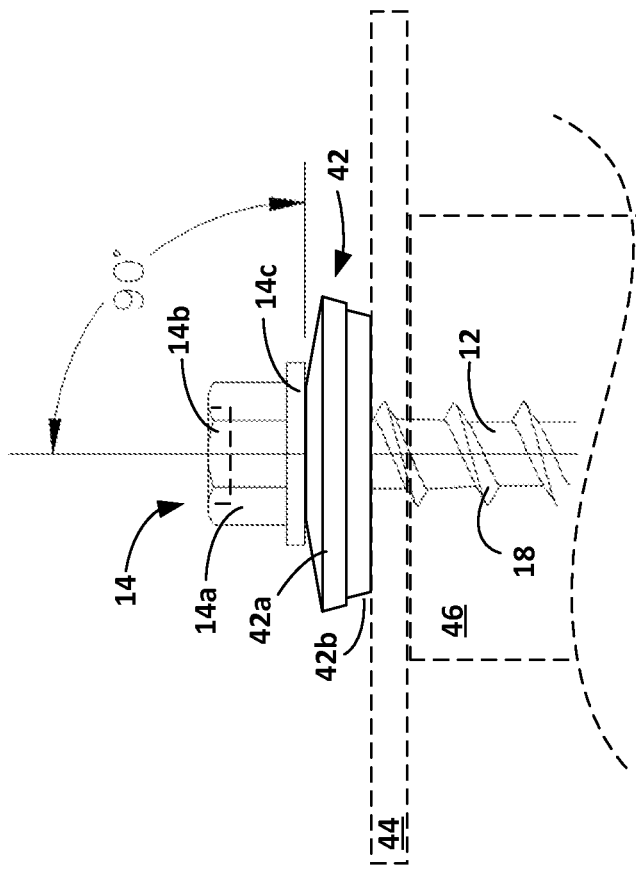

As shown in FIG. 4, a sealing washer 42 may be disposed around a portion of the shank 12 and against the head 14 of the fastener 10. The sealing washer 42 may include a resilient sealing element 42b and/or a cap 42a. The sealing element 42b may, for example, be made of natural or synthetic rubber. The cap 42a may, for example, be a non-resilient washer. The cap 42a may be a steel washer. The resilient sealing element 42b may be vulcanized to the cap 42b to form a seal that prevents leaking even when the fastener is driven at an angle. In one embodiment, the sealing washer 42 may be a single washer (e.g., rubber washer). The resilient sealing element 42b may be an elastomeric rubber-like material for use as a sealing washer that will resist the degrading effects of ultraviolet radiation and ozone in the atmosphere. The sealing element when compressed may allow for the sealing material to flow unrestrained into internal voids that are inherently present in an assembly with the fastener. The sealing element(s) may allow for the fastener and the sealing element(s) to provide a weather-tight function for a desired number of years consistent with companion materials used in the construction of the building.

The fastener 10 may be screwed into a first object 44 and into a second object 46 that is adjacent to the first object 44. The first object 44 may be, for example, plastic, sheet metal, or composite material. The second object 46 may be, for example, wood, metal structure, sheet metal, plastic. As shown in FIG. 4, when the fastener 10 is screwed into the first object 44 and the second object 46, a surface of the first object 44 is secured against a surface of the second object 46. In addition, the head 14 of the fastener 10 forms a seal with the sealing washer 42, and the sealing washer 42 forms a seal with a surface of the first object 44. While in FIG. 4, the surface of the first object 44 is provided against the surface of the second object 46 in the vicinity of the fastener 10, in some embodiments, a space may be provided between the surface of the first object 44 and the surface of the second object 46 in the vicinity of the fastener 10.

In one embodiment, the head 14 may have a shape designed to cooperate with the structure of sealing washer 42. The head 14 may be formed with a torque-receiving portion 14a for receiving torque with a torque-applying tool. In one embodiment, the head 14 may include a recess 14b for receiving torque with a torque-applying tool. The torque-receiving portion 14a may sit against an annular flange 14c on the shank side of which is formed an annular, tapered portion 30 (e.g., a frusto-conical tapered portion). The tapered portion 30 may have a conical figure with a base abutting the torque receiving portion 14a and/or the annular flange 14c. The frustum of the tapered portion 30 may join to an end of the shank 12. The tapered portion may provide for a washer 42 to be self-centered during assembly. As shown in the figures, the annular flange 14c may include a flat portion on each side. The flange is not limited to this configuration and may include configurations having other shapes. For example, the flange may have a flat shape on one side and/or a cupped shape on the opposite side to provide the head 14 with a cupped head configuration for receiving at least a portion of the washer 42 provided under the head 14.

Figure 5:
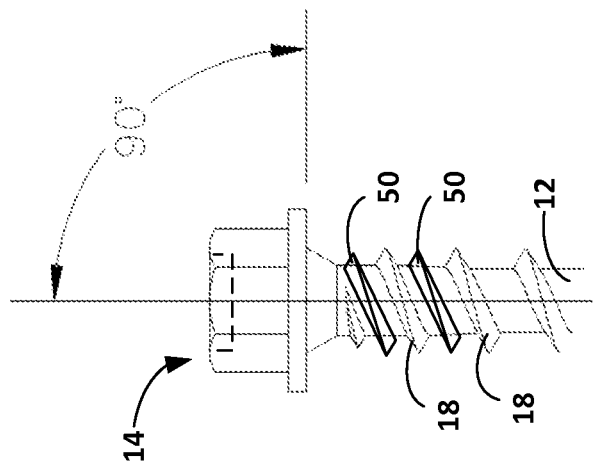
FIG. 5 illustrates an exemplary embodiment of a fastener according to another embodiment of the present disclosure.

FIG. 5 illustrates an exemplary embodiment of a fastener according to another embodiment of the present disclosure. Features of the embodiment of the fastener shown in FIG. 5 may be combined with one or more feature of the fastener shown in FIGS. 1-4. As shown in FIG. 5, in addition to a first thread 18 being formed on the shank 12 at the distal end of the fastener, a third thread 50 may be formed on the shank 12 at the distal end of the fastener. The third thread 50 may be radially located 180 degrees from the first thread 18. The third thread 50 may extend along the shank 12 from the first location L1 and towards the drill point 16. The third thread 50 may extend towards the drill point 16 for a short distance (e.g., one eights of the length of the shank 12). The third thread 50 may extend towards the drill point 16 and stop before the second thread 20 starts at the second location L2. The first and third threads may both stop at the same axial location of the shank but be offset by 180 degrees (e.g., terminate on opposite sides of the surface of the shank 12).

Utilizing the third thread 50 may provide for the sealing washer 42 to be positioned against the annular flange 14c after assembly. A thickness of the sealing washer 42 may be made equal to the pitch between the first thread 18 and the third thread 50. Such thickness of the sealing washer 42 may allow the sealing washer 42 to fit between the first and third thread while being mounted on the fastener. When the sealing washer 42 is fully inserted on the fastener, it can be positioned such that the plane of the sealing washer 42 is substantially perpendicular to the axis of the shank 12. In addition, once the sealing washer 42 is fully inserted on the fastener, the first and third threads may support the sealing washer 42 in place and against the annular flange 14c. Accordingly, the slippage of the washer or gasket from the position in which it is located at the head of the fastener can be reduced.

The fastener 10 may be coated with a protective material. In one embodiment, the fastener 10 may be made of steel or iron and may be coated with a protective zinc coating via galvanization. In other embodiments, the fastener may be coated with a material via electrodepositing, electroplating, electro-galvanizing, and/or mechanical plating.

The relationship of the first thread 18 and the second thread 20 may provide benefits in the installation and the installed structural strength of the fastener. The construction industry is sensitive to the speed in which the components of a building can be installed. Disruption in the speed of installation may be costly to the builder. In addition, when metal sheeting (e.g., first object 44) is attached to framing (e.g., second object 46), a weather-tight seal is desired to remain for a relatively long period of time. Fasteners that are structurally inferior can often be loosened after installation by wind forces acting against the underside of the wall and/or roof sheeting causing the weather-tight seal between the fastener and the sheeting to be compromised. Moisture from wind driven rain can undesirably enter the building causing damage to its contents and deterioration of the structural framing components.

The drill point 16 having a drill point that begins generally at the point apex and is of a sharpness and hardness that has been proven, through practice, provides for consistent penetration of a surface of an object (e.g., metal sheeting) in a short period of time (e.g., an average time of 0.2 to 0.3 seconds). As the drill point 16 clears a pilot hole, the threads 18 and 20 may contact and engage the steel panel and advance into the substrate. When the thread 18 and 20 have a same pitch, a symmetrical support may be provided to the fastener shank 12 to allow the initial threading engagement into the steel to be smooth and uninterrupted. As the fastener advances through the sheeting and into the structural substrate, the uniform height of threads 18 and 20 may provide equilateral support to the fastener shank 12 to prevent the fastener from being installed at an undesirable acute angle to the sheeting. As the fastener further advances into the structural substrate, the threads 18 and 20 may transition to a different height (e.g., thread major diameter 18a), and follow the helical groove started in the substrate by the previously engaged threads. The increased height of thread may allow for deeper radial engagement of the uninterrupted substrate material thereby providing higher withdrawal strength to the installed fastener. The helical groove may also prevent excessive unsymmetrical lateral forces on the fastener shank 12 to prevent the fastener from being installed at an undesirable acute angle to the metal panel being fastened. The withdrawal strength is further supplemented by the ratio of the radial diameter of the second thread radial diameter to the smaller radial diameter of the shank. Accordingly, the design of the fastener according to embodiment of the present disclosure is beneficial to the construction personnel because they provide for quick installation that is accurate and provides a desired hold over extended periods of time.

Figure 6:
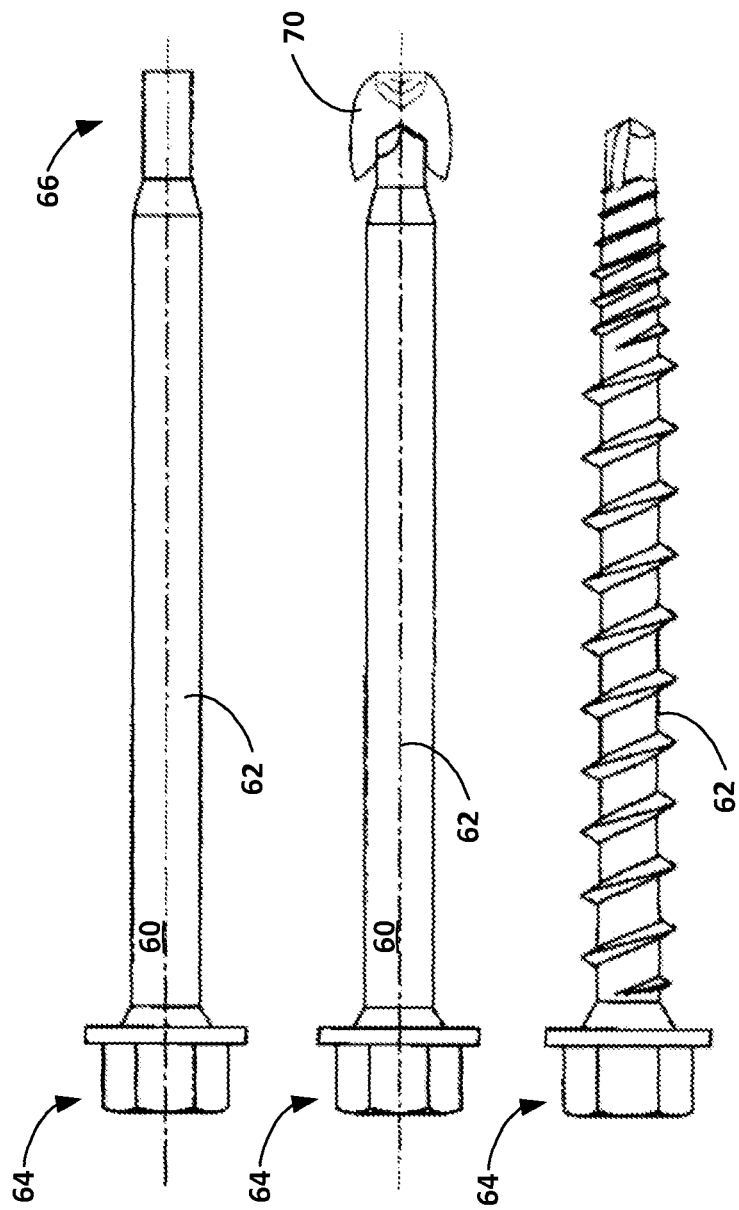
FIG. 6 illustrates a method of manufacturing a fastener according to an embodiment of the present disclosure.

FIG. 6 illustrates a method of manufacturing a fastener according to an embodiment of the present disclosure. As shown in FIG. 6, a blank 60 may be extruded having an elongated shank 62, a head 64 at a distal end of the shank 62, and an end point 66 at a terminal end of the shank 62. The blank 60 may be provided between two dies that are disposed at the end point 66 of the blank 60 to form a drill point. As shown in FIG. 6, after the dies are applied to the end point 66 of the blank 60, the drill point is formed with pointing scarp 70 attached to the end point 66.

With the drill point formed, the plurality of threads (e.g., the first thread, the second thread and/or the third thread discussed above) are formed with a threading machine that applied a plurality of dies to the blank 60 that have a mold of the threads to be applied to the fastener. The dies may include all of the threads (i.e., the first and second threads) that will be formed on the blank 60. The pointing scarp 70 may be removed by the dies forming the thread on the blank. With the drill point and the threads formed, the fastener may be heat treated to provide desired metal characteristics and coated with a material (e.g., galvanized or electroplated).

The design of the fastener and/or the manufacturing process may also provide benefits in the manufacturing of the fastener. For example, typically the taper to the apex of the gimlet point and the threads along the shank are performed by the single operation of the thread die. Manufacturing the fastener in the manner discussed above may be divided among three operations, as the tapering of the blank and pinching of the drill point may be done in separate stages, prior to the tapered screw blank with the pinched drill point entering the threading operation. Such manufacturing process may prolong the useful life of the thread die as it does not undergo the stress of displacing large amounts of steel needed to roll pinch a gimlet point. Thus, the thread dies will not dull and wear out as quickly, and instead remain sharper, longer, providing screw threads with smooth consistently sharp edges throughout the manufacturing operation. Such manufacturing process will also eliminate the operation of a slot cut near the tip to remove a spiral shaving inherent as the gimlet point screw advances through the steel panel. This slotting operation is difficult to control and may yield unpredictable results, often cutting the point of the fastener and/or disrupting the initial drilling thread. In addition, during installation of standard fasteners, the spiral shaving often times remains intact, embedding itself and compromising the sealing washer and creating a source for moisture infiltration. The drill point discussed above will create shavings that are much smaller and may eliminate this problem of trapping the spiral shaving, allowing the washer to seal as intended.

In one embodiment, the fasteners discussed above may be used in post-frame construction where buildings are constructed with a wood structural frame (vertical wooden posts and horizontal wooden trusses) and exterior walls made of roll-formed corrugated metal panels. The panels being affixed to the wooden substructure with the fasteners. However, the fasteners according to the various embodiments discussed above are not limited to post-frame construction and may be used in other applications.

While the embodiment of the present disclosure have been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

I claim:

1. A fastener comprising:
an elongated shank;
a head at a distal end of the shank, the head adapted for receiving torque to rotate the fastener;
a drill point at a terminal end of the shank, which is opposite to the distal end;
a first thread starting at the drill point and extending along the shank towards the head at the distal end of the shank; and
a second thread starting at the drill point, extending along the shank towards the head, and stopping in an axial direction before the first thread ends, wherein the second thread is radially located 180 degrees from the first thread, a pitch of the first thread between the head and the stopping location of the second thread is greater than the pitch of the threads between the stopping location of the second thread and the drill point at least along a portion of the shank where the thread are radially located 180 degrees from each other, and the drill point includes a plurality of radially extending cutting edges and one or more relieved flute portions extending along the surface of the drill point.

2. The fastener of claim 1, wherein the drill point includes two radially extending cutting edges that are spaced apart approximately by 180 degrees.

3. The fastener of claim 2, wherein the drill point includes two relieved flute portions, one relieved flute portion extending axially from one of the cutting edges and abutting or intersecting a thread run-out from the first thread, and the other relieved flute portion extending axially from the other cutting edges and abutting or extending a thread run-out of the second thread.

4. The fastener of claim 1, wherein the plurality of cutting edges are non-concurrent and are offset from each other in a radial direction of the shank.

5. The fastener of claim 1, further comprising a sealing washer disposed around a portion of the shank and against the head.

6. The fastener of claim 1, further comprising a third thread starting at a location along the shank between the head and the stopping location of the second thread, extending along the shank towards the head, and radially located 180 degrees from the first thread.

7. The fastener of claim 1, wherein a diameter of the drill point is smaller than a diameter of the shank.

8. The fastener of claim 1, wherein a thread major diameter of the first thread is equal to a thread major diameter of the second thread along a portion of the shank where the first and second threads are radially located 180 degrees from each other.

9. The fastener of claim 1, further comprising an annular tapered portion joining the head and the shank.

10. A fastener comprising:
an elongated shank;
a head at a distal end of the shank, the head adapted for receiving torque to rotate the fastener;
a drill point at a terminal end of the shank, which is opposite to the distal end;
a first thread starting at the drill point and extending along the shank towards the head at the distal end of the shank; and
a second thread starting at the drill point, extending along the shank towards the head, and stopping in an axial direction before the first thread ends, wherein the second thread is radially located 180 degrees from the first thread, the drill point includes a plurality of radially extending cutting edges and one or more relieved flute portions extending along the surface of the drill point, and a thread major diameter of the first thread is equal to a thread major diameter of the second thread along a portion of the shank where the first and second threads are radially located 180 degrees from each other.

11. The fastener of claim 10, wherein a thread major diameter of the first thread between the head and the stopping location of the second thread is greater than the thread major diameter of the first thread between the stopping location of second thread and the drill point.

12. The fastener of claim 10, wherein a diameter of the drill point is smaller than a diameter of the shank.

13. The fastener of claim 10, wherein a pitch of the first thread between the head and the stopping location of the second thread is greater than the pitch of the threads between the stopping location of the second thread and the drill point at least along a portion of the shank where the thread are radially located 180 degrees from each other.

14. A fastener for joining a first object to a second object, comprising:
a head having a portion adapted for receiving torque to rotate the fastener;
an annular tapered portion joined to the torque receiving portion; and
a shank portion joined to and extending from the annular tapered portion, the shank portion having a first thread and a second thread, the shank terminating at a distal tapered drill point remote from the head portion, the tapered point adapted to extend through a preformed aperture in the first object or to create such aperture as it is rotationally forced against the first object, the first thread having a beginning at the tapered drill point and spirally extending along the periphery of the shank at a defined pitch and terminating at a predetermined first axial location from underside of the head, the second thread having a beginning at the tapered drill point and extending spirally along the periphery of the shank at the predetermined pitch, the second thread being located radially 180 degrees from the first thread and between convolutions of the first thread and terminating at a predetermined second axial location from underside of the head, the first thread and the second thread having a radially extended height, the height of the first thread transitionally increasing from a first height to a second height at a said predetermined second axial location in a plane normal to the axis of the shank, the second thread terminating at said predetermined second axial location being essentially coplanar with the first thread transition, the first thread spirally extending uninterruptedly at the second height beyond said coplanar axial location and terminating at said predetermined first axial location, and a thread major diameter of the first thread being equal to a thread major diameter of the second thread along a portion of the shank where the first and second threads are radially located 180 degrees from each other.

15. The fastener as claimed in claim 14 wherein the first and the second threads begin in a plane normal to the axis of the shank, and the first thread and the second thread beginning is coplanar.

16. The fastener as claimed in claim 14 wherein the first thread and the second thread beginnings are radially spaced from each other by 180 degrees.

17. The fastener as claimed in claim 14 in which the pitch of the first thread is the same as the pitch of the second thread.

18. The fastener as claimed in claim 17 in which the second thread is located equidistant from adjacent convolutions of the first thread.

19. The fastener of claim 14, wherein a diameter of the drill point is smaller than a diameter of the shank.

20. A fastening system comprising:
a fastener for joining a first object to a second object, comprising: a head having a portion adapted for receiving torque to rotate the fastener; an annular tapered portion joined to the torque receiving portion; and a shank portion joined to and extending from the annular tapered portion, the shank portion having a first thread and a second thread, the shank terminating at a distal tapered drill point remote from the head portion, the tapered point adapted to extend through a preformed aperture in the first object or to create such aperture as it is rotationally forced against the object, the first thread having a beginning at the tapered drill point and spirally extending along the periphery of the shank at a defined pitch and terminating at a predetermined first axial location from underside of the head, the second thread having a beginning at the tapered drill point and extending spirally along the periphery of the shank at the predetermined pitch, the second thread being located radially 180 degrees from the first thread and between convolutions of the first thread and terminating at a predetermined second axial location from underside of the head, the first thread and the second thread having a radially extended height, the height of the first thread transitionally increasing from a first height to a second height at said predetermined second axial location in a plane normal to the axis of the shank, the second thread terminating at said predetermined second axial location being essentially coplanar with the first thread transition, the first thread spirally extending uninterruptedly at the second height beyond said coplanar axial location and terminating at said predetermined first axial location, and a thread major diameter of the first thread being equal to a thread major diameter of the second thread along a portion of the shank where the first and second threads are radially located 180 degrees from each other; and
a sealing washer having a through-bore aperture and positioned with the fastener shank extending through the aperture, the washer being located at the termini of the first thread and being supported by the thread termini from freely moving axially along the shank and thereby being undesirably displaced axially toward the fastener distal end.

21. The fastening system as claimed in claim 20 wherein the washer is a one-piece resilient elastomeric material and is disposed against the head including a cupped head configuration.

22. The fastening system as claimed in claim 20 wherein the washer is of bonded metal and elastomeric material construction disposed under the flat head of the fastener.

23. The fastening system of claim 20, further comprising a third thread starting at a location along the shank between the head and the predetermined second axial location and extending along the shank towards the head, and wherein the washer is located at the termini of the third thread and is supported by the third thread termini from freely moving axially along the shank and thereby being undesirably displaced axially toward the fastener distal end.

24. A fastener for joining a first object to a second object, comprising:
a head having a portion adapted for receiving torque to rotate the fastener;
an annular tapered portion joined to the torque receiving portion; and
a shank portion joined to and extending from the annular tapered portion, the shank portion having a first thread and a second thread, the shank terminating at a distal tapered drill point remote from the head portion, the tapered point adapted to extend through a preformed aperture in the first object or to create such aperture as it is rotationally forced against the first object, the first thread having a beginning at the tapered drill point and spirally extending along the periphery of the shank at a defined pitch and terminating at a predetermined first axial location from underside of the head, the second thread having a beginning at the tapered drill point and extending spirally along the periphery of the shank at the predetermined pitch, the second thread being located radially 180 degrees from the first thread and between convolutions of the first thread and terminating at a predetermined second axial location from underside of the head, the first thread and the second thread having a radially extended height, the height of the first thread transitionally increasing from a first height to a second height at said predetermined second axial location in a plane normal to the axis of the shank, the second thread terminating at said predetermined second axial location being essentially coplanar with the first thread transition, the first thread spirally extending uninterruptedly at the second height beyond said coplanar axial location and terminating at said predetermined first axial location, and a pitch of the first thread between the head and the stopping location of the second thread is greater than the pitch of the threads between the stopping location of the second thread and the drill point at least along a portion of the shank where the thread are radially located 180 degrees from each other.

25. The fastener of claim 24, wherein a diameter of the drill point is smaller than a diameter of the shank.

* * * * *